R. A. LAMBERT.

ARTIFICIAL FISH BAIT.

APPLICATION FILED MAY 18, 1914.

Reissued Nov. 17, 1914. 13,828.

WITNESSES

W. H. Funnell Jr.

Lillie M. Perkey.

INVENTOR

Richard A. Lambert by W. H. Funnell

Atty.

UNITED STATES PATENT OFFICE.

RICHARD A. LAMBERT, OF TACOMA, WASHINGTON.

ARTIFICIAL FISH-BAIT.

13,828. Specification of Reissued Letters Patent. Reissued Nov. 17, 1914.

Original No. 1,067,178, dated July 8, 1913, Serial No. 749,962. Application for reissue filed May 18, 1914. Serial No. 839,439.

*To all whom it may concern:*

Be it known that I, RICHARD A. LAMBERT, a citizen of the United States, residing at Tacoma, in the county of Pierce and State of Washington, have invented certain new and useful Improvements in Artificial Fish-Bait, of which the following is a specification.

This invention relates to artificial fish bait wherein bait, hook, and sinker are made integral, that is to say, combined in a unitary structure.

It is a well known fact that eyes are excellent fish bait.

The present invention has for its object to provide a hook with artificial eyes used as bait to attract the fish, the artificial eyes being combined with the sinker and hook in one device in such a way as to eliminate the necessity of carrying the several parts separately.

Figure 1:
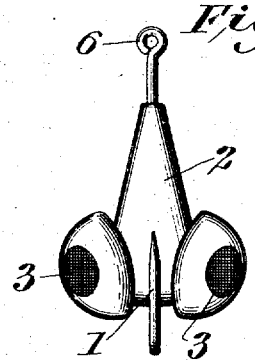
Figure 2:
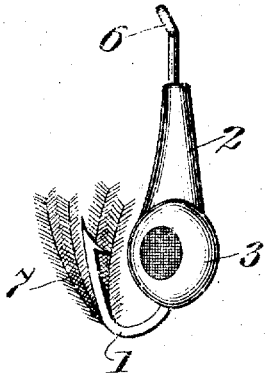
Figure 3:
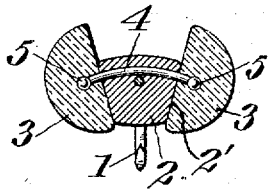

In the accompanying drawings illustrating the invention, in the several figures of which like parts are similarly designated, Figure 1 is a front elevation; Fig. 2 is a side elevation showing also the addition of feathers, and Fig. 3 is a cross-section taken directly through the center of the eyes.

Referring more particularly to the drawings, 1 indicates a fish hook; 2 is a lead sinker cast around the hook 1 so as to form a unitary part thereof, the said sinker being provided with flat surfaces, as shown at 2′, against which artificial eyes 3 which are made of any suitable material, such as glass, celluloid or the like are secured by means of a wire or bar 4. As shown, this wire or bar is provided at each end with heads 5 adapted to be inserted in recesses formed in the backs of the eyes 3. The upper end of the hook is adapted, as by the loop 6, to receive the end of a fishing line in the usual manner. Around the point of the hook I preferably arrange a tuft of feathers 7, adapted to conceal the point of the hook and also to serve as an additional lure for the fish.

It is to be understood that the artificial eyes 3 may be made of any suitable material and in sizes to suit the user's fancy.

While in the foregoing I have shown and described the preferred embodiment of my invention, I wish it to be understood that I may change the specific arrangement of parts without in any way departing from the spirit and scope of my invention.

Having thus fully described my invention, what I claim is:—

1. Artificial fish-bait, comprising a fish-hook, and artificial eyes having an attached wire which is rigidly fixed to the shank of the hook.

2. Artificial fish-bait, comprising a fish-hook and artificial eyes having an attached wire which is rigidly fixed to the shank of the hook opposite its barbed end.

3. Artificial fish-bait, comprising a fish-hook, and a pair of artificial eyes having an attached wire by which the eyes are rigidly connected to one another and to the shank of the fish-hook.

4. Artificial fish-bait, comprising a fish-hook, a pair of lustrous bodies, and a wire connecting these bodies and rigidly and fixedly applied to the shank of the hook.

5. Artificial fish-bait, comprising a fish-hook, a pair of lustrous lobes, a wire rigidly connecting the lobes with one another and also with the hook, and a sinker permanently and rigidly applied to the hook and the wire at the junction of the hook and wire.

6. Artificial fish-bait, comprising a fish-hook, artificial eyes, a wire having its opposite ends fixed in the backs of said eyes, and a sinker cast around the shank of the hook and embracing said wire and serving to fix the wire to the shank and thereby rigidly locate the eyes on the hook.

7. As an article of manufacture, a fish-hook, a sinker cast around the shank of said hook, eyes having recesses, and a bar having heads formed thereon and engaging the recesses in the eyes, said bar arranged in the said sinker adjacent to the shank.

In testimony whereof I affix my signature in presence of two witnesses.

RICHARD A. LAMBERT.

Witnesses:

CHESTER H. THOMPSON,
WALTER S. LITTLE.